(12) United States Patent
Lim

(10) Patent No.: US 12,482,870 B2
(45) Date of Patent: Nov. 25, 2025

(54) BATTERY MANAGEMENT APPARATUS AND METHOD

(71) Applicant: LG ENERGY SOLUTION, LTD., Seoul (KR)

(72) Inventor: Bo Mi Lim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 154 days.

(21) Appl. No.: 18/039,649

(22) PCT Filed: Jan. 4, 2022

(86) PCT No.: PCT/KR2022/000059
§ 371 (c)(1),
(2) Date: May 31, 2023

(87) PCT Pub. No.: WO2022/149822
PCT Pub. Date: Jul. 14, 2022

(65) Prior Publication Data
US 2024/0006670 A1    Jan. 4, 2024

(30) Foreign Application Priority Data

Jan. 8, 2021    (KR) ......................... 10-2021-0002906

(51) Int. Cl.
*H01M 10/42*    (2006.01)
*G01R 31/367*    (2019.01)
*G01R 31/396*    (2019.01)

(52) U.S. Cl.
CPC ........ *H01M 10/425* (2013.01); *G01R 31/367* (2019.01); *G01R 31/396* (2019.01);
(Continued)

(58) Field of Classification Search
CPC .. H01M 10/425; G01R 31/396; G01R 31/367
See application file for complete search history.

(56) References Cited

U.S. PATENT DOCUMENTS

2009/0212736 A1    8/2009  Baarman et al.
2012/0133324 A1    5/2012  Baarman et al.
(Continued)

FOREIGN PATENT DOCUMENTS

CN    111366848 A    7/2020
CN    111381170 A    7/2020
(Continued)

OTHER PUBLICATIONS

International Search Report for PCT/KR2022/000059 (PCT/ISA/210) mailed on Apr. 11, 2022.
(Continued)

*Primary Examiner* — Minh Q Phan
(74) *Attorney, Agent, or Firm* — Birch, Stewart, Kolasch & Birch, LLP

(57) ABSTRACT

A battery management apparatus can include a measuring unit configured to measure a voltage and a current of a battery cell, an analyzing unit configured to analyze correlations between a plurality of extraction methods for extracting a feature of the battery cell and an objective variable, and a determining unit configured to select at least one extraction method from among the plurality of extraction methods based on the correlations between the plurality of extraction methods and the objective variable.

21 Claims, 7 Drawing Sheets

(52) U.S. Cl.
CPC ............... *H01M 2010/4271* (2013.01); *H01M 2010/4278* (2013.01)

(56) References Cited

U.S. PATENT DOCUMENTS

| | | | |
|---|---|---|---|
| 2014/0074416 | A1 | 3/2014 | Park et al. |
| 2014/0303915 | A1 | 10/2014 | Jo et al. |
| 2015/0308970 | A1 | 10/2015 | Massefski, Jr. et al. |
| 2016/0195586 | A1 | 7/2016 | Martin et al. |
| 2016/0231388 | A1 | 8/2016 | Park |
| 2017/0030974 | A1 | 2/2017 | Becker et al. |
| 2017/0033572 | A1 | 2/2017 | Becker et al. |
| 2018/0203072 | A1 | 7/2018 | Park et al. |
| 2018/0269540 | A1 | 9/2018 | Tanaka et al. |
| 2019/0027784 | A1 | 1/2019 | Nose |
| 2019/0086478 | A1 | 3/2019 | Park et al. |
| 2020/0075172 | A1 | 3/2020 | Noh |
| 2020/0088798 | A1 | 3/2020 | Park et al. |
| 2020/0355749 | A1 | 11/2020 | Takahashi et al. |
| 2022/0075000 | A1 | 3/2022 | Cha et al. |
| 2024/0027537 | A1* | 1/2024 | Lim .................. H02J 7/005 |

FOREIGN PATENT DOCUMENTS

| | | | |
|---|---|---|---|
| CN | 112147530 | A | 12/2020 |
| JP | 5213978 | B2 | 6/2013 |
| JP | 2016-532107 | A | 10/2016 |
| JP | 2017-227539 | A | 12/2017 |
| JP | WO2017/026149 | A1 | 5/2018 |
| JP | 2018-524602 | A | 8/2018 |
| JP | 2018-173370 | A | 11/2018 |
| JP | 2019-21515 | A | 2/2019 |
| JP | WO2019/138286 | A1 | 2/2021 |
| KR | 10-2010-0122934 | A | 11/2010 |
| KR | 10-2014-0053592 | A | 5/2014 |
| KR | 10-1486470 | B1 | 1/2015 |
| KR | 10-2016-0097030 | A | 8/2016 |
| KR | 10-2018-0084358 | A | 7/2018 |
| KR | 10-2019-0032780 | A | 3/2019 |
| KR | 10-1992051 | B1 | 6/2019 |
| KR | 10-2020-0024570 | A | 3/2020 |
| KR | 10-2020-0056716 | A | 5/2020 |
| KR | 10-2020-0131629 | A | 11/2020 |
| KR | 10-2283957 | B1 | 7/2021 |
| WO | WO 2014/089346 | A1 | 6/2014 |
| WO | WO 2018/147194 | A1 | 8/2018 |

OTHER PUBLICATIONS

Extended European Search Report for European Application No. 22736799.2, dated Apr. 18, 2024.

* cited by examiner

BATTERY MANAGEMENT APPARATUS AND METHOD

TECHNICAL FIELD

Cross-Reference to Related Application

This application claims priority to and the benefit of Korean Patent Application No. 10-2021-0002906 filed in the Korean Intellectual Property Office on Jan. 8, 2021, the entire contents of which are incorporated herein by reference.

Technical Field

Embodiments disclosed herein relate to a battery management apparatus and method.

BACKGROUND ART

Recently, research and development of secondary batteries have been actively performed. Herein, the secondary batteries, which are chargeable/dischargeable batteries, may include all of conventional nickel (Ni)/cadmium (Cd) batteries, Ni/metal hydride (MH) batteries, etc., and recent lithium-ion batteries. Among the secondary batteries, a lithium-ion battery has a much higher energy density than those of the conventional Ni/Cd batteries, Ni/MH batteries, etc. Moreover, the lithium-ion battery may be manufactured to be small and lightweight, such that the lithium-ion battery has been used as a power source of mobile devices. In addition, the lithium ion battery is attracting attention as a next-generation energy storage medium as a usage range thereof is expanded to a power source of electric vehicles.

Furthermore, the secondary battery is generally used as a battery pack including a battery module where a plurality of battery cells are connected to one another in series and/or in parallel. The battery pack may be managed and controlled by a battery management system in terms of a state and an operation.

To diagnose such battery cells, a feature indicating state information of a battery cell is extracted. However, when a feature regarding a state of a battery cell is extracted according to a conventional scheme, even the same feature may differ with an extraction method. In this case, the same feature may have poor uniformity and it is difficult to know with which extraction method a feature extracted is accurate according to an objective variable.

DISCLOSURE

Technical Problem

Embodiments disclosed herein provide a battery management apparatus and method, in which correlations between various extraction methods for extracting a feature and an objective variable are analyzed to select a method that is most appropriate for an objective variable desired by a user, thereby improving accuracy in diagnosing abnormality of a battery cell.

Technical problems of the embodiments disclosed herein are not limited to the above-described technical problems, and other unmentioned technical problems would be clearly understood by one of ordinary skill in the art from the following description.

Technical Solution

A battery management apparatus according to an embodiment disclosed herein includes a measuring unit configured to measure a voltage and a current of a battery cell, an analyzing unit configured to analyze correlations between a plurality of extraction methods for extracting a feature of the battery cell and an objective variable, and a determining unit configured to select at least one extraction method from among the plurality of extraction methods based on the correlations between the plurality of extraction methods and the objective variable.

According to an embodiment, the determining unit may be further configured to select an extraction method having a correlation, greater than or equal to a first reference value, with the objective variable from among the plurality of extraction methods.

According to an embodiment, the analyzing unit may be further configured to analyze correlations among the plurality of extraction methods.

According to an embodiment, the determining unit may be further configured to select an extraction method having a correlation, greater than or equal to a second reference value, from among the plurality of extraction methods.

According to an embodiment, the battery management apparatus may further include a correcting unit configured to perform correction on the feature of the battery cell in which the correlation between the extraction method selected by the determining unit and the objective variable is less than a third reference value less than the first reference value.

According to an embodiment, the correcting unit may be further configured to perform correction on the feature of the battery cell through smoothing with respect to the feature.

According to an embodiment, the analyzing unit may be further configured to analyze the correlations between the plurality of extraction methods and the objective variable through Pearson analysis.

According to an embodiment, the determining unit may be further configured to select an extraction method from among the plurality of extraction methods based on a median of correlation data calculated through the Pearson analysis.

According to an embodiment, the battery management apparatus may further include a calculating unit configured to calculate the feature of the battery cell based on the at least one extraction method selected by the determining unit.

According to an embodiment, the feature may be calculated based on a differential value of a capacity with respect to the voltage of the battery cell.

A battery management method according to an embodiment disclosed herein includes measuring a voltage and a current of a battery cell, analyzing correlations between a plurality of extraction methods for extracting a feature of the battery cell and an objective variable, and selecting at least one extraction method from among the plurality of extraction methods based on the correlations between the plurality of extraction methods and the objective variable.

According to an embodiment, the selecting of the at least one extraction method from among the plurality of extraction methods may include selecting an extraction method having a correlation, greater than or equal to a first reference value, with the objective variable.

According to an embodiment, the battery management method may further include analyzing the correlations among the plurality of extraction methods.

According to an embodiment, the selecting of the at least one extraction method from among the plurality of extraction methods may include selecting an extraction method having a correlation, greater than or equal to a second reference value, from among the plurality of extraction methods.

According to an embodiment, the battery management method may further include performing correction on the feature of the battery cell in which the correlation between the selected extraction method and the objective variable is less than a third reference value less than the first reference value.

Advantageous Effects

In a battery management apparatus and method according to an embodiment disclosed herein, correlations between various extraction methods for extracting a feature and an objective variable may be analyzed to select a method that is most appropriate for an objective variable desired by a user, thereby improving accuracy in diagnosing abnormality of a battery cell.

MODE FOR INVENTION

Figure 1:
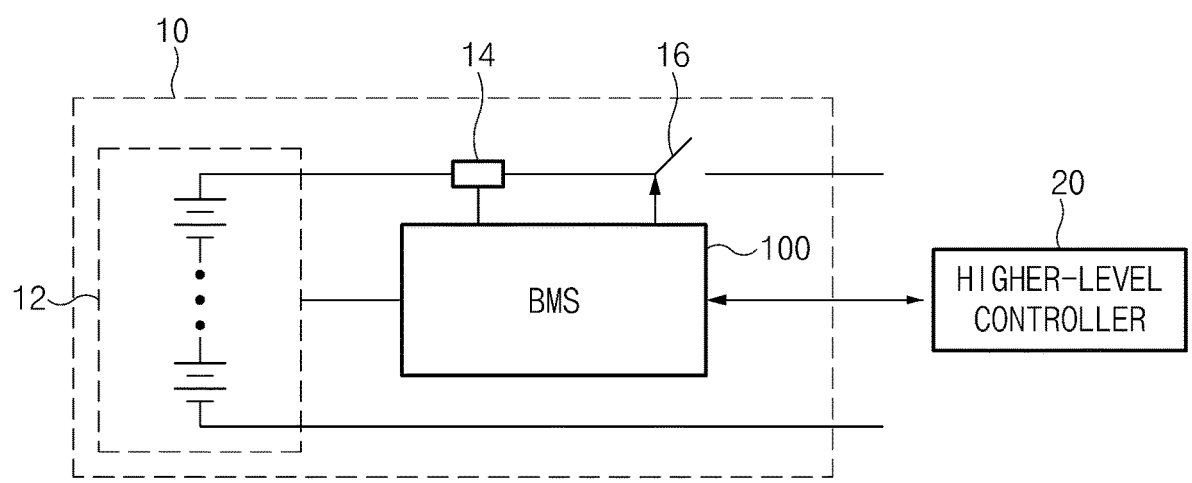
FIG. 1 is a block diagram of a general battery pack including a battery management apparatus according to an embodiment disclosed herein.

Hereinafter, various embodiments disclosed herein will be described in detail with reference to the accompanying drawings. In this document, identical reference numerals will be used for identical components in the drawings, and the identical components will not be redundantly described.

For various embodiments disclosed herein, specific structural or functional descriptions are only exemplified for the purpose of describing the embodiments, and various embodiments disclosed herein may be implemented in various forms, and should not be construed as being limited to the embodiments described herein.

As used in various embodiments, the terms "1st, "2nd", "first", "second", or the like may modify various components regardless of importance, and do not limit the components. For example, a first component may be named as a second component without departing from the right scope of an embodiment disclosed herein, and similarly, the second component may be named as the first component.

Terms used in the present document are used for only describing a specific exemplary embodiment of the disclosure and may not have an intention to limit the scope of other exemplary embodiments of the disclosure. It is to be understood that the singular forms include plural references unless the context clearly dictates otherwise.

All terms including technical and scientific terms used herein have the same meaning as commonly understood by one of ordinary skill in the art to which the embodiments disclosed herein belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments disclosed herein.

FIG. 1 is a block diagram of a general battery pack including a battery management apparatus according to an embodiment disclosed herein.

More specifically, FIG. 1 schematically shows a battery control system 1 including a battery pack 10 and a higher-level controller 20 included in a higher-level system according to an embodiment disclosed herein.

As shown in FIG. 1, the battery pack 10 may include a plurality of battery modules 12, a sensor 14, a switching unit 16, and a battery management system 100. The battery pack 10 may include the battery module 12, the sensor 14, the switching unit 16, and the battery management system 100 provided in plural.

The plurality of battery modules 12 may include at least one chargeable/dischargeable battery cells. In this case, the plurality of battery modules 12 may be connected in series or in parallel.

The sensor 14 may detect current flowing in the battery pack 10. In this case, a detected signal may be transmitted to the battery management system 100.

The switching unit 16 may be connected in series to a (+) terminal side or a (−) terminal side of the battery module 12 to control the charging/discharging current flow of the battery module 12. For example, the switching unit 16 may use at least one relay, a magnetic contactor, etc., according to the specifications of the battery pack 10.

The battery management system 100 may monitor the voltage, current, temperature, etc., of the battery pack 10 to perform control and management to prevent overcharging and overdischarging, etc., and may include, for example, an RBMS (Rack Battery Management System).

The battery management system 100, which is an interface for receiving measurement values of the above-described various parameter values, may include a plurality of terminals and a circuit, etc., connected thereto to process input values. The battery management system 100 may control on/off of the switching unit 16, e.g., a relay, a contactor, etc., and may be connected to the battery module 12 to monitor the state of each battery module 12.

Meanwhile, in the battery management system 100 disclosed herein, as will be described later, correlations between a plurality of extraction methods for extracting a feature of a battery cell and an objective variable may be calculated through a separate program and may be analyzed to select an appropriate extraction method for extracting a feature.

The higher-level controller 20 may transmit a control signal for controlling the battery module 12 to the battery management system 100. Thus, the battery management system 100 may be controlled in terms of an operation thereof based on a signal applied from the higher-level controller 20. Also, the battery module 12 may be a component included in an energy storage system (ESS). In this case, the higher-level controller 20 may be a controller of a battery bank (BBMS) including the plurality of packs 10 or an ESS controller for controlling the entire ESS including a plurality of banks. However, the battery pack 10 is not limited to such a purpose.

Such configurations of the battery pack 10 and the battery management system 100 are well-known configurations, and thus will not be described in detail.

Figure 2:
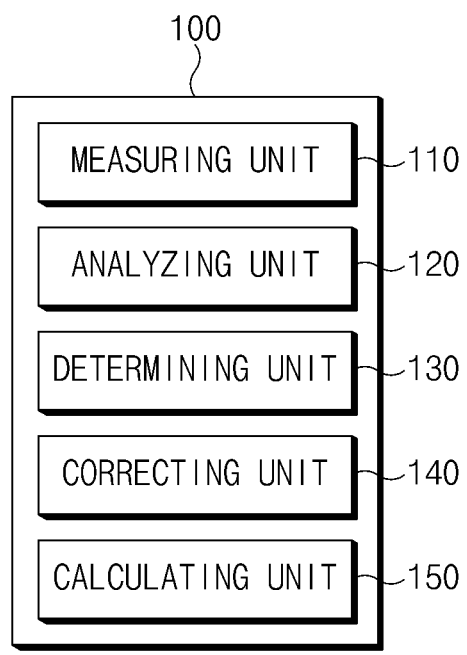
FIG. 2 is a block diagram illustrating a structure of a battery management apparatus, according to an embodiment disclosed herein.

FIG. 2 is a block diagram illustrating a structure of a battery management apparatus, according to an embodiment disclosed herein.

Referring to FIG. 2, the battery management apparatus 100 according to an embodiment disclosed herein may include a measuring unit 110, an analyzing unit 120, a determining unit 130, a correcting unit 140, and a calculating unit 150.

The measuring unit 110 may measure a voltage and a current of the battery cell. The measuring unit 110 may measure the voltage and the current of the battery cell at specific time intervals. The voltage and the current measured by the measuring unit 110 may be used to calculate a feature for each of the battery cells. For example, the feature of the battery cell may be a value calculated based on a differential value (dQ/dV) of a capacity with respect to a voltage of the battery cell.

The analyzing unit 120 may analyze correlations between a plurality of extraction methods for extracting a feature of a battery cell and an objective variable, by using a voltage and a current of the battery cell. The analyzing unit 120 may also analyze correlations among the plurality of extraction methods. In this case, the analyzing unit 120 may analyze the correlations between the plurality of extraction methods and the objective variable and the correlations among the plurality of extraction methods through Pearson analysis method. The objective variable may be a capacity or an aging degree (e.g., a state of health (SOH)) of a battery cell.

For example, an extraction method for extracting a feature of a battery cell may include a point sum and a trapezoidal sum to a peak of the aforementioned differential value (dQ/dV) of a capacity with respect to a voltage of the battery cell, a sum of accumulative points (e.g., three points) and a trapezoidal sum after rise of the differential value (dQ/dV) of a capacity with respect to a voltage of the battery cell, a sum of initial accumulative points (e.g., five points) of the differential value (dQ/dV) of a capacity with respect to a voltage of the battery cell, etc.

The determining unit 130 may select at least one extraction method from among the plurality of extraction methods based on correlations between the plurality of extraction methods and an objective variable. In this case, the determining unit 130 may select an extraction method having a correlation, greater than or equal to a first reference value (e.g., 0.7), with the objective variable. The determining unit 130 may also select an extraction method having a correlation, greater than or equal to a second reference value (e.g., 0.7), between the plurality of extraction methods.

That is, the determining unit 130 may select an extraction method having a correlation, greater than or equal to the first reference value, with the objective variable and a correlation, greater than or equal to the second reference value, between the extraction methods. For example, the determining unit 130 may select an extraction method by comparing a median of correlation data calculated through Pearson analysis with reference values.

The correcting unit 140 may perform correction on a feature of a battery cell in which a correlation between the extraction method selected by the determining unit 130 and the objective variable is less than a third reference value less than the first reference value. For example, the correcting unit 140 may perform correction on battery cells corresponding to a lower quartile of correlation data calculated through Pearson analysis.

More specifically, the correcting unit 140 may perform correction on a feature of a battery cell through smoothing with respect to the feature. For example, smoothing may include schemes such as Gaussian process regression (GPR), Fourier (frequency), Savitzky-Golay filtering (moving average), etc. As such, the correcting unit 140 may perform correction by approximating the feature using various smoothing schemes, when discrete data such as noise, etc., occurs for battery cells in which the correlation between the selected extraction method and the objective variable is relatively low.

The calculating unit 150 may calculate a feature of each battery cell based on the extraction method selected by the determining unit 130. That is, the calculating unit 150 may calculate the feature according to an extraction method selected from among a plurality of extraction methods by the determining unit 130 based on the correlation, and obtain a desired objective variable based on the calculated feature.

In a battery management apparatus and method according to an embodiment disclosed herein, correlations between various methods for extracting features and an objective variable may be analyzed to select a method that is most appropriate for an objective variable desired by a user, thereby improving accuracy in diagnosing abnormality of a battery cell.

Figure 3:
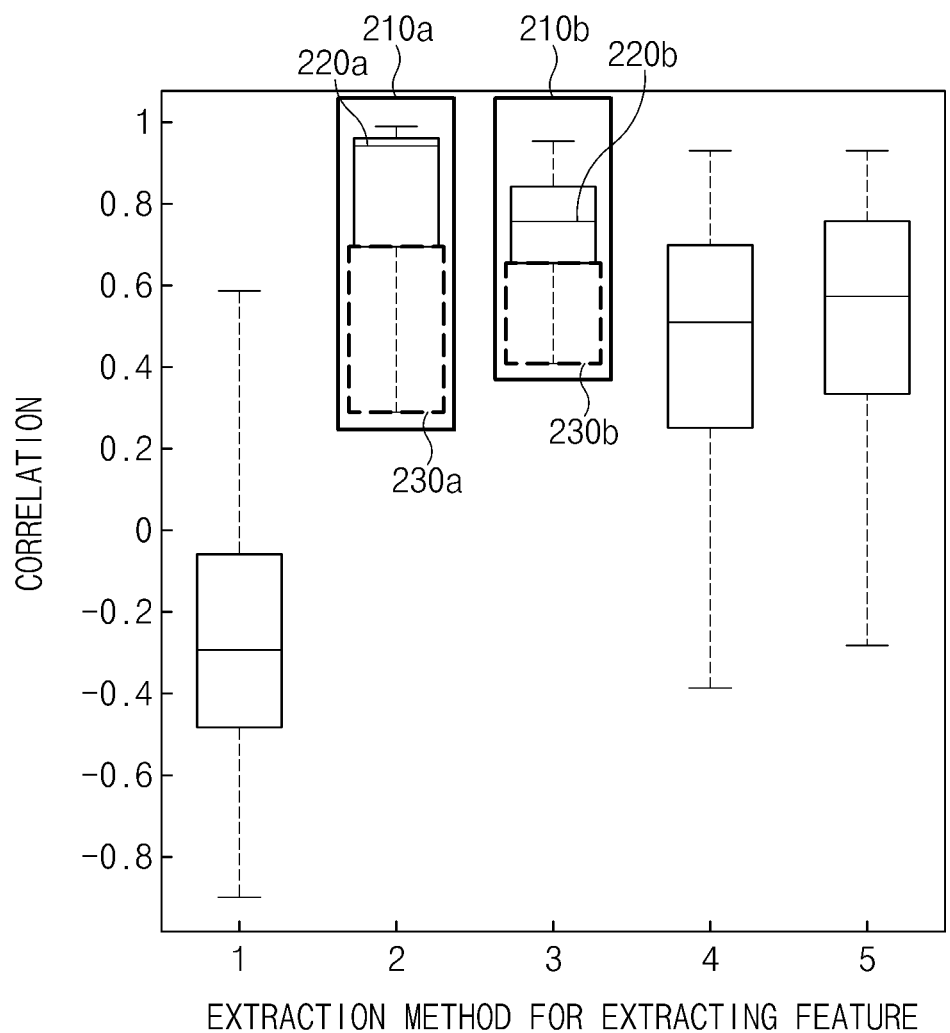
FIG. 3 is a view showing a correlation between an extraction method for extracting a feature of a battery cell and an objective variable, in which the correlation is calculated by a battery management apparatus according to an embodiment disclosed herein.

FIG. 3 is a view showing a correlation between a method for extracting a feature of a battery cell and an objective variable, in which the correlation is calculated by a battery management apparatus according to an embodiment disclosed herein.

Referring to FIG. 3, a horizontal axis indicates extraction methods 1 to 5 for extracting a feature of a battery cell, which are available in a battery management apparatus according to an embodiment disclosed herein, and a vertical axis indicates a correlation between each extraction method and an objective variable. In this case, in FIG. 3, a correlation between an extraction method and an objective variable is calculated using a Pearson correlation analysis method.

The extraction methods for extracting a feature of a battery cell, shown in FIG. 3, include 1. a point sum to a peak of a differential value dQ/dV of a capacity with respect to a voltage of the battery cell, 2. a sum of three accumulative points after rise of the differential value dQ/dV of the capacity with respect to the voltage of the battery cell, 3. a trapezoidal sum to the peak of the differential value dQ/dV of the capacity with respect to the voltage of the battery cell, 4. a sum of three accumulative trapezoids after rise of the differential value dQ/dV of the capacity with respect to the voltage of the battery cell, and 5. a sum of five initial accumulative points of the differential value dQ/dV of the capacity with respect to the voltage of the battery cell. An objective variable Y of FIG. 3 may be an SOH of the battery cell.

More specifically, in FIG. 3, a correlation between an extraction method for extracting a feature of a battery cell and an objective variable may be determined based on a median of Pearson correlation analysis. In this case, medians of the extraction methods 1 to 5 may be 0.29, 0.94, 0.75, 0.51, and 0.55, respectively, as shown in FIG. 3. For example, when the first reference value is 0.7, the extraction method 2 210a having a median 220a of 0.94 and the extraction method 3 210b having a median 220b of 0.75 in FIG. 3 may be selected.

Correction may be performed on a feature of a battery cell in which a correlation between the extraction method selected in FIG. 3 and the objective variable is less than the third reference value. For example, in the extraction method 2 and the extraction method 3 of FIG. 3, correction may be performed on battery cells 230a and 230b corresponding to a lower quartile of Pearson correlation data. That is, in the selected extraction methods, for the battery cells 230a and 230b of the lower quartile, which have relatively low correlations with the objective variable, discrete data such as noise, etc., may be generated. In this case, correction may be performed by approximating a feature through smoothing, thereby accurately extracting the feature.

Figure 4:
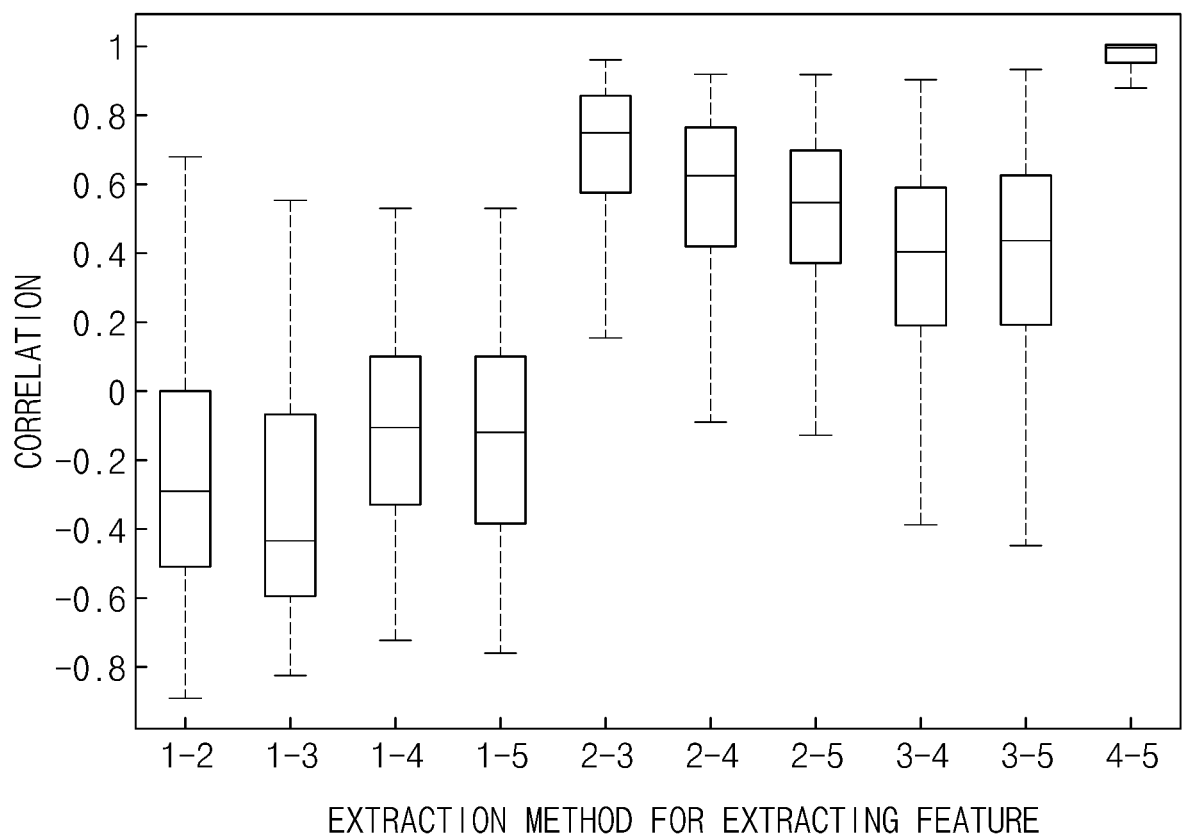
FIG. 4 is a view showing correlations among extraction methods for extracting a feature of a battery cell, in which the correlation is calculated by a battery management apparatus according to an embodiment disclosed herein.

FIG. 4 is a view showing correlations among extraction methods for extracting a feature of a battery cell, in which the correlation is calculated by a battery management apparatus according to an embodiment disclosed herein.

Referring to FIG. 4, a horizontal axis indicates matching two of the extraction methods 1 to 5 for extracting a feature of a battery cell, which are available in a battery management apparatus according to an embodiment disclosed herein, and a vertical axis indicates correlations among the extraction methods. In this case, in FIG. 4, a correlation between an extraction method and an objective variable is calculated using a Pearson correlation analysis method. The extraction methods 1 to 5 shown in FIG. 4 may be the same as the extraction methods shown in FIG. 3.

As shown in FIG. 4, it may be seen that a correlation varies from extraction method to extraction method. For example, when the second reference value is 0.7, the extraction methods 2 and 3 and the extraction methods 4 and 5 among the extraction methods shown in FIG. 4 may be selected. That is, it may mean that when the objective variable is calculated based on features extracted by the extraction methods 2 and 3 and the extraction methods 4 and 5, similar results may be obtained.

In this case, correlations between the extraction methods 2 and 3 and the objective variable in FIG. 3 are determined to be greater than or equal to the first reference value, such that the extraction method 2 or 3 may be selected to calculate the objective variable. When a user selects one extraction method, the user may select the extraction method 2 having the higher correlation with the objective variable.

While a method for selecting an extraction method for extracting a feature, which is appropriate for calculating an objective variable, based on correlations between extraction methods for extracting a feature of a battery cell and an objective variable and correlations among the extraction methods have been described, the battery management apparatus disclosed herein is not limited thereto. For example, Spearman correlation analysis as well as Pearson correlation analysis may be used, and the first to third reference values may be set variously according to a need.

Figure 5:
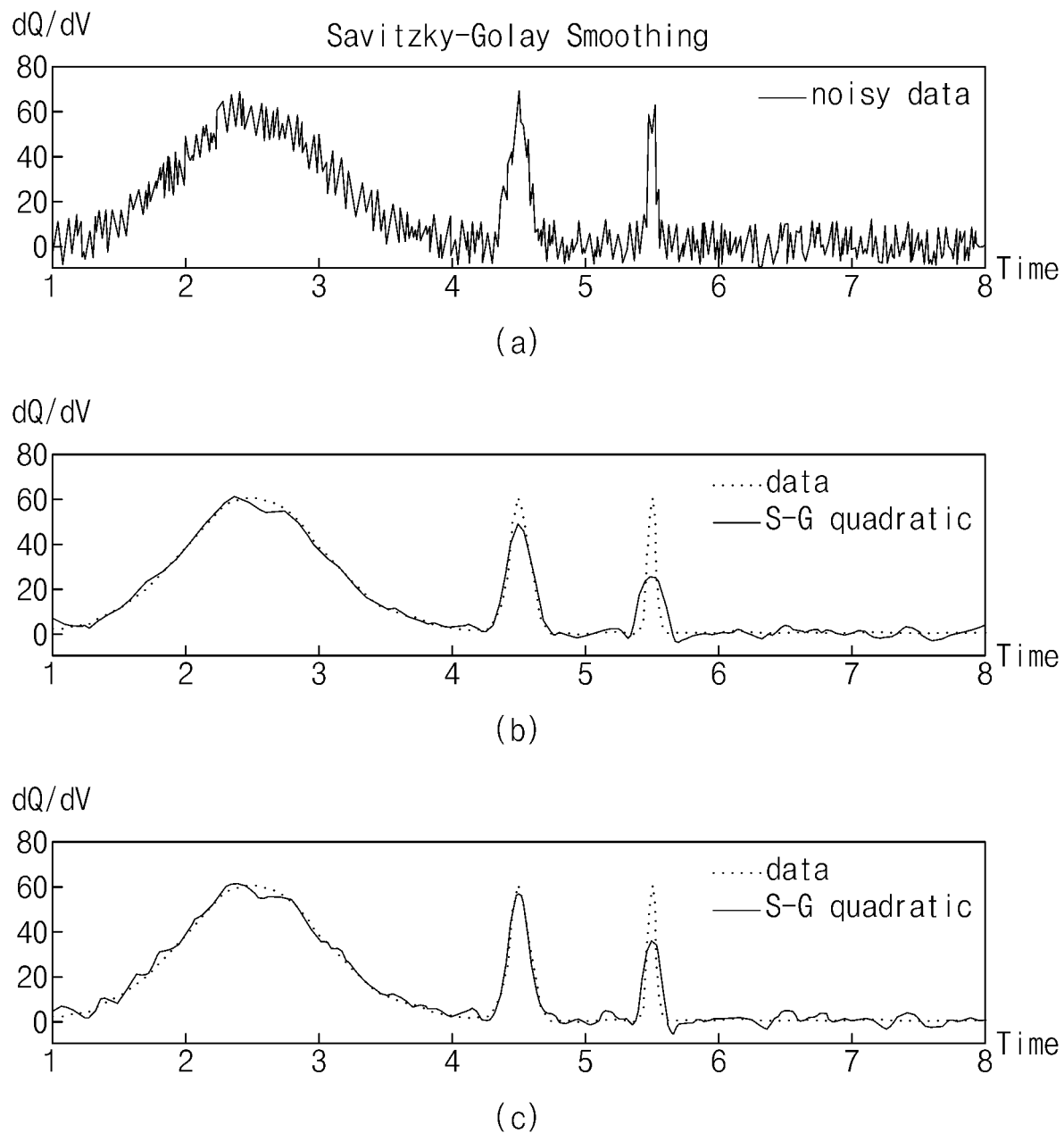
FIG. 5 is a view showing that a battery management apparatus according to an embodiment disclosed herein corrects a feature of a battery cell.

FIG. 5 is a view showing that a battery management apparatus according to an embodiment disclosed herein corrects a feature of a battery cell.

Referring to FIG. 5, a process of performing correction by using a Savitzky-Golay filtering correction method is shown. In FIG. 5, a horizontal axis indicates time (m) and a vertical axis indicates a feature (dQ/dV) of a battery cell.

Referring to (a) of FIG. 5, the feature of the battery cell is calculated according to the selected extraction method, but for a battery cell corresponding to a relatively low correlation with the objective variable (e.g., a lower quartile of Pearson correlation analysis), noise such as an error, static, etc., may occur. In this case, as shown in (b) and (c) of FIG. 5, correction may be performed by gradually smoothing graphs.

More specifically, the Savitzky-Golay filtering correction method shown in FIG. may be used as one of moving average methods. The moving average method may perform correction by continuously calculating an average of two or more consecutive inputs in a graph. First, an average of n points previous to a specific point in a graph may be calculated and an average may be obtained by moving a window one by one. For example, for n=3, in points 2 to 7, an average of the points 2, 3, and 4 may be obtained and by moving the window by one, an average of the points 3, 4, and 5 may be obtained, and in this way, smoothing may be performed. As the window size increases, the effect of smoothing may also increase.

Meanwhile, the Savitzky-Golay filtering correction method is used in FIG. 5, but the battery management apparatus disclosed herein is not limited thereto, and various correction methods such as Gaussian process regression, Fourier (frequency), etc., may be used.

Figure 6:
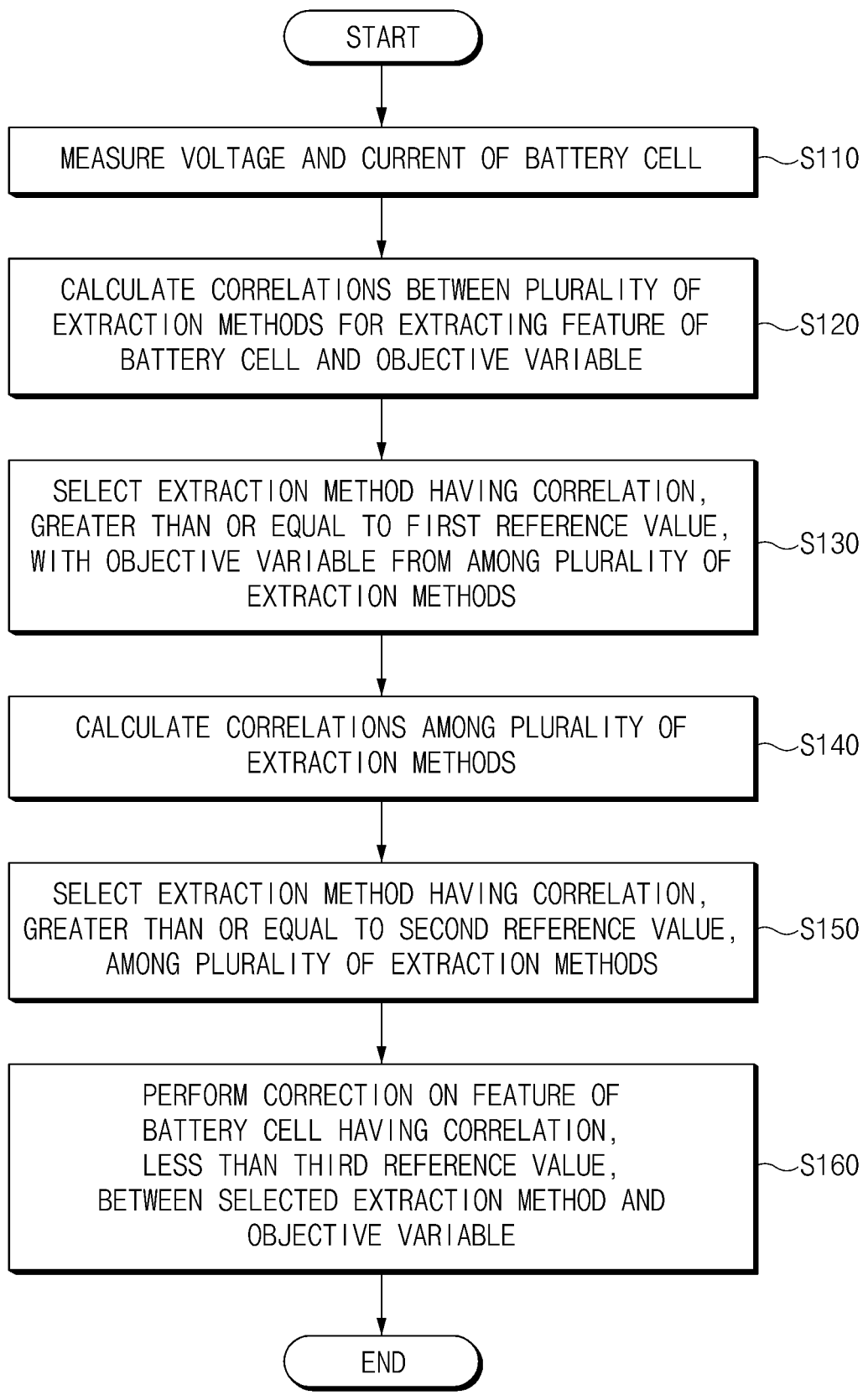
FIG. 6 is a flowchart illustrating a battery management method according to an embodiment disclosed herein.

FIG. 6 is a flowchart illustrating a battery management method according to an embodiment disclosed herein.

Referring to FIG. 6, a battery management method according to an embodiment disclosed herein may measure a voltage and a current of a battery cell in operation S110. In this case, the voltage and the current of the battery cell may be measured at specific time intervals. In operation S110, the measured voltage and current may be used to calculate a feature for each of the battery cells. For example, the feature of the battery cell may be a value calculated based on a differential value (dQ/dV) of a capacity with respect to a voltage of the battery cell.

Correlations between a plurality of extraction methods for extracting a feature of the battery cell and an objective variable may be calculated in operation S120. The objective variable may be a capacity or an aging degree (e.g., an SOH) of the battery cell. For example, in operation S120, the correlation may be calculated based on Pearson correlation analysis.

For example, an extraction method for extracting a feature of a battery cell may include a point sum and a trapezoidal sum to a peak of the aforementioned differential value (dQ/dV) of a capacity with respect to a voltage of the battery cell, a sum of accumulative points (e.g., three points) and a trapezoidal sum after rise of the differential value (dQ/dV) of a capacity with respect to a voltage of the battery cell, a sum of initial accumulative points (e.g., five points) of the differential value (dQ/dV) of a capacity with respect to a voltage of the battery cell, etc.

In operation S130, an extraction method having a correlation, greater than or equal to the first reference value, with the objective variable may be selected from among the plurality of extraction methods. For example, in Pearson correlation analysis, the first reference value may be 0.7 based on a median.

Next, correlations among the plurality of extraction methods may be calculated in operation S140. In this case, two of the plurality of extraction methods may be selected at random and a correlation therebetween may be calculated. In operation S150, an extraction method having a correlation, greater than or equal to the second reference value, among the plurality of extraction methods may be selected. For example, in Pearson correlation analysis, the second reference value may be 0.7 based on a median. Correction may be performed on a feature of a battery cell in which a correlation between the selected extraction method and the objective variable is less than the third reference value. For example, in operation S160, correction may be performed on battery cells corresponding to a lower quartile of correlation data calculated through Pearson analysis.

More specifically, in operation S160, correction may be performed on a feature of a battery cell through smoothing with respect to the feature. For example, smoothing may include schemes such as Gaussian process regression (GPR), Fourier (frequency), Savitzky-Golay filtering (moving average), etc., described above.

While not shown in FIG. 6, the battery management method according to an embodiment disclosed herein may calculate a feature of each battery cell based on the extraction method selected in operations S110 to S150. Thus, the feature may be calculated according to an extraction method selected from among a plurality of extraction methods based on the correlation, and obtain a desired objective variable based on the calculated feature.

Moreover, it has been described with reference to FIG. 6 that the correlations between the plurality of extraction methods for extracting a feature of a battery cell and the objective variable are first compared in operations S120 and S130, and then the correlations among the plurality of extraction methods are compared in operations S140 and S150, but the battery management method according to an embodiment disclosed herein is not limited thereto. That is, after the correlations among the plurality of extraction methods may be first obtained to primarily obtain methods corresponding to a high correlation between the extraction methods, the correlations between the obtained extraction methods and the objective variable may be calculated to select an extraction method having a higher correlation with the objective variable.

In this way, in the battery management method according to an embodiment disclosed herein, correlations between various methods for extracting features and an objective variable may be analyzed to select a method that is most appropriate for an objective variable desired by a user, thereby improving accuracy in diagnosing abnormality of a battery cell.

Figure 7:
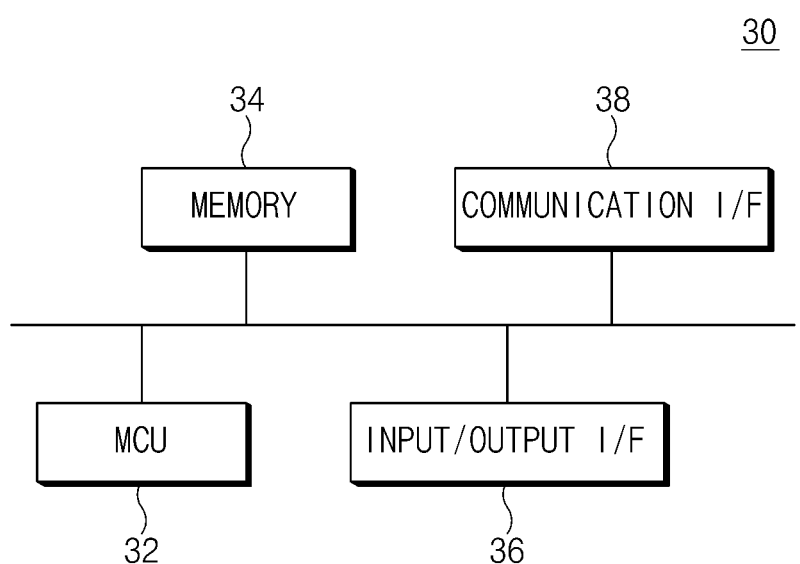
FIG. 7 is a block diagram illustrating a computing system that performs a battery management method according to an embodiment disclosed herein.

FIG. 7 is a block diagram illustrating a computing system that performs a battery management method according to an embodiment disclosed herein.

Referring to FIG. 7, a computing system 30 according to an embodiment disclosed herein may include an MCU (microcontroller unit) 32, a memory 34, an input/output interface (I/F) 36, and a communication I/F 38.

The MCU 32 may be a processor that executes various programs (e.g., a correlation analysis program, a feature calculation and correction program, etc.) stored in the memory 34, processes various data including a voltage, a current, an SOH, etc., of a battery cell through these programs, and executes the above-described functions of the battery management apparatus shown in FIG. 2.

The memory 34 may store various programs regarding correlation analysis and feature correction, etc., of the battery cell. Moreover, the memory 34 may store various data such as a voltage, a current, SOH data, etc., of each battery cell.

The memory 34 may be provided in plural, depending on a need. The memory 34 may be a volatile memory or a nonvolatile memory. For the memory 34 as the volatile memory, random access memory (RAM), dynamic RAM (DRAM), static RAM (SRAM), etc., may be used. For the memory 34 as the nonvolatile memory, read only memory (ROM), programmable ROM (PROM), electrically alterable ROM (EAROM), erasable PROM (EPROM), electrically erasable PROM (EEPROM), flash memory, etc., may be used. The above-listed examples of the memory 34 are merely examples and are not limited thereto.

The input/output I/F 36 may provide an interface for transmitting and receiving data by connecting an input device (not shown) such as a keyboard, a mouse, a touch panel, etc., and an output device such as a display (not shown), etc., with the MCU 32.

The communication I/F 38, which is a component capable of transmitting and receiving various data to and from a server, may be various types of devices capable of supporting wired or wireless communication. For example, a program for correlation analysis and feature extraction for a battery cell or various data, etc., may be transmitted and received to and from a separately provided external server through the communication I/F 38.

As such, a computer program according to an embodiment disclosed herein may be recorded in the memory 34 and processed by the MCU 32, thus being implemented as a module that performs functions shown in FIG. 2.

Even though all components constituting an embodiment disclosed herein have been described above as being combined into one or operating in combination, the embodiments disclosed herein are not necessarily limited to the embodiments. That is, within the object scope of the embodiments disclosed herein, all the components may operate by being selectively combined into one or more.

Moreover, terms such as "include", "constitute" or "have" described above may mean that the corresponding component may be inherent unless otherwise stated, and thus should be construed as further including other components rather than excluding other components. All terms including technical or scientific terms have the same meanings as those generally understood by those of ordinary skill in the art to which the embodiments disclosed herein pertain, unless defined otherwise. The terms used generally like terms defined in dictionaries should be interpreted as having meanings that are the same as the contextual meanings of the relevant technology and should not be interpreted as having ideal or excessively formal meanings unless they are clearly defined in the present document.

The above description is merely illustrative of the technical idea of the present disclosure, and various modifications and variations will be possible without departing from the essential characteristics of embodiments of the present disclosure by those of ordinary skill in the art to which the embodiments disclosed herein pertains. Therefore, the embodiments disclosed herein are intended for description rather than limitation of the technical spirit of the embodiments disclosed herein and the scope of the technical spirit of the present disclosure is not limited by these embodiments disclosed herein. The protection scope of the technical spirit disclosed herein should be interpreted by the following claims, and all technical spirits within the same range should be understood to be included in the range of the present document.

DESCRIPTION OF REFERENCE NUMERALS

| | |
|---|---|
| 1: Battery Control System | 10: Battery Pack |
| 12: Plurality of Battery Modules | 14: Sensor |
| 16: Switching Unit | 20: Higher-Level Controller |
| 30: Battery Management Apparatus | 32: MCU |
| 34: Memory | 36: Input/Output I/F |

| | |
|---|---|
| 38: Communication I/F | 100: Battery Management Apparatus (BMS) |
| 110: Measuring Unit | 120: Analyzing Unit |
| 130: Determining Unit | 140: Correcting Unit |
| 150: Calculating Unit | |

The invention claimed is:

1. A battery management apparatus comprising:
a measuring unit configured to measure a voltage and a current of a battery cell;
an analyzing unit configured to analyze correlations between a plurality of extraction methods for extracting a feature of the battery cell and an objective variable; and
a determining unit configured to identify at least one extraction method from among the plurality of extraction methods based on the correlations between the plurality of extraction methods and the objective variable, and select the at least one extraction method as a method that is appropriate for the objective variable that improves accuracy in determining an abnormality of the battery cell.

2. The battery management apparatus of claim 1, wherein the determining unit is further configured to select an extraction method having a correlation, greater than or equal to a first reference value, with the objective variable from among the plurality of extraction methods.

3. The battery management apparatus of claim 1, wherein the analyzing unit is further configured to analyze correlations among the plurality of extraction methods.

4. The battery management apparatus of claim 3, wherein the determining unit is further configured to select an extraction method having a correlation, greater than or equal to a second reference value, from among the plurality of extraction methods.

5. The battery management apparatus of claim 2, further comprising a correcting unit configured to perform correction on the feature of the battery cell in which the correlation between the extraction method selected by the determining unit and the objective variable is less than a third reference value less than the first reference value.

6. The battery management apparatus of claim 5, wherein the correcting unit is further configured to perform correction on the feature of the battery cell through smoothing with respect to the feature.

7. The battery management apparatus of claim 1, wherein the analyzing unit is further configured to analyze the correlations between the plurality of extraction methods and the objective variable through Pearson analysis.

8. The battery management apparatus of claim 7, wherein the determining unit is further configured to select an extraction method from among the plurality of extraction methods based on a median of correlation data calculated through the Pearson analysis.

9. The battery management apparatus of claim 1, further comprising a calculating unit configured to calculate the feature of the battery cell based on the at least one extraction method selected by the determining unit.

10. The battery management apparatus of claim 1, wherein the feature is calculated based on a differential value of a capacity with respect to the voltage of the battery cell.

11. The battery management apparatus of claim 1, wherein the objective variable includes at least one of a capacity and a state of health (SOH) of the battery cell.

12. The battery management apparatus of claim 1, wherein the plurality of extraction methods include a method to obtain:
a point sum and a trapezoidal sum to a peak of a differential value (dQ/dV) of a capacity with respect to the voltage of the battery cell,
a sum of accumulative points and the trapezoidal sum after a rise of the differential value (dQ/dV) of the capacity with respect to the voltage of the battery cell, and
a sum of initial accumulative points of the differential value (dQ/dV) of the capacity with respect to the voltage of the battery cell.

13. The battery management apparatus of claim 5, wherein the correcting unit is configured to perform the correction on the feature of the battery cell using at least one of a Savitzky-Golay filtering correction method, a Gaussian process regression method and a Fourier (frequency) method.

14. A battery management method comprising:
measuring a voltage and a current of a battery cell;
analyzing correlations between a plurality of extraction methods for extracting a feature of the battery cell and an objective variable; and
identifying at least one extraction method from among the plurality of extraction methods based on the correlations between the plurality of extraction methods and the objective variable, and selecting the at least one extraction method as a method that is appropriate for the objective variable that improves accuracy in determining an abnormality of the battery cell.

15. The battery management method of claim 14, wherein the selecting of the at least one extraction method from among the plurality of extraction methods comprises selecting an extraction method having a correlation, greater than or equal to a first reference value, with the objective variable.

16. The battery management method of claim 14, further comprising analyzing the correlations among the plurality of extraction methods.

17. The battery management method of claim 16, wherein the selecting of the at least one extraction method from among the plurality of extraction methods comprises selecting an extraction method having a correlation, greater than or equal to a second reference value, from among the plurality of extraction methods.

18. The battery management method of claim 15, further comprising performing correction on the feature of the battery cell in which the correlation between the selected extraction method and the objective variable is less than a third reference value less than the first reference value.

19. The battery management method of claim 14, wherein the objective variable includes at least one of a capacity and a state of health (SOH) of the battery cell.

20. The battery management method of claim 14, wherein the plurality of extraction methods include a method to obtain:
a point sum and a trapezoidal sum to a peak of a differential value (dQ/dV) of a capacity with respect to the voltage of the battery cell,
a sum of accumulative points and the trapezoidal sum after a rise of the differential value (dQ/dV) of the capacity with respect to the voltage of the battery cell, and
a sum of initial accumulative points of the differential value (dQ/dV) of the capacity with respect to the voltage of the battery cell.

21. The battery management method of claim 18, wherein the correction on the feature of the battery cell is performed using at least one of a Savitzky-Golay filtering correction method, a Gaussian process regression method and a Fourier (frequency) method.

* * * * *